United States Patent [19]

Gergaud et al.

[11] 4,227,178

[45] Oct. 7, 1980

[54] DECENTRALIZED DATA TRANSMISSION SYSTEM

[75] Inventors: Claude J. Gergaud, Cagnes sur Mer; Etienne Grimanelli, Vence; Andre G. Tracol, Cagnes sur Mer, all of France

[73] Assignee: International Business Machines Corporation, Armonk, N.Y.

[21] Appl. No.: 944,453

[22] Filed: Sep. 21, 1978

[30] Foreign Application Priority Data

Oct. 18, 1977 [FR] France ............................ 77 32158

[51] Int. Cl.³ .......................... H04Q 9/00; G06F 3/00
[52] U.S. Cl. ................................ 340/147 R; 364/900; 370/110
[58] Field of Search ............................ 364/200, 900; 340/147 SY, 147 R; 179/15 AL, 15 BA, 15 BY

[56] References Cited

U.S. PATENT DOCUMENTS

| | | | |
|---|---|---|---|
| 3,796,835 | 3/1974 | Closs et al. | 179/15 BY |
| 3,845,472 | 10/1974 | Buchanan et al. | 340/147 R |
| 3,851,104 | 11/1974 | Willard et al. | 179/15 BY |
| 3,856,993 | 12/1974 | Closs et al. | 179/15 BY |
| 4,161,786 | 7/1979 | Hopkins et al. | 364/900 |

Primary Examiner—Donald J. Yusko
Attorney, Agent, or Firm—Edward H. Duffield

[57] ABSTRACT

Described is a decentralized data transmission system and a method of operating the system. A relatively high speed transmission medium connects a number of relatively lower speed terminals in a loop or similar configuration. A central or monitoring station is connected in the transmission medium which includes a memory table containing the listing of the station addresses connected to the transmission loop. The monitoring station operates as a control station for transmitting the address of a first station to be enabled to transmit a message. The addressed station recognizes its address and responds either with a message destined for another station or with a signal that no message is to be sent. At the end of a message, an enabled station sends a special character to notify the monitoring station that the next station in the memory table can be addressed to grant usage of the transmission medium.

13 Claims, 7 Drawing Figures

DECENTRALIZED DATA TRANSMISSION SYSTEM

DESCRIPTION

1. Technical Field

This invention relates to data transmission systems in general and especially to those systems more particularly adapted for the internal transmission of data between various points on a given site.

2. Prior Art

Two generally known techniques are usually applied for switching data between network stations. A time multiplexing technique, considered first, operates by a method of assigning channels for use by a given station by forming transmission frames in a timed sequence for allocation to each transmitting station. In this case, when a station wants to perform a transmission toward a destination station, it inserts the characters of its message into the channel or time slot assigned to the destination station. This is performed sequentially on a character by character basis by insertion into each of the successive allotted time frames for a given station. One advantage of this technique lies in the fact that all the stations in the network can start to transmit without waiting for the the transmission of complete messages by the other stations. Another advantage is that this method does not require much space in a buffer provided at each station for provisionally storing the data characters. However, the systems using this technique also have the disadvantage of requiring a sophisticated procedure for operating the time multiplexing apparatus and for detecting proper time slots and synchronizing each station which reduces their flexibility. In addition, adapters are necessarily provided for each channel at the switching center and this requires the use of sophisticated communication controllers at the switching center.

The second technique to be considered is also called a "Message Switching Technique." This method involves transmitting complete messages from one station to another one. Such a system is described in French Pat. No. 70 14712 filed in France on Apr. 24, 1970 by the present applicant and assigned to the common assignee hereof. In the system described in the aforementioned patent, a communication controller is provided at each switching center. The controller includes a storage having tables indicating which of the transmission channels linking it to the various data processing units are available or, if not available, what the status of the channels may be. One disadvantage of such a system lies in the fact that the system is required to be "intelligent enough" in the sense of having sufficient computer processing and programming facilities to be able to manage the message transmissions. This involves the use of sophisticated systems of the IBM 3968 or IBM 3705 type.

Another similar technique is shown in U.S. Pat. No. 3,732,543 assigned to the common assignee hereof. In this system, a loop switching teleprocessing method and system using the same are disclosed. A polling technique is utilized for controlling access to the loop communications system. A control unit sends out two special polling characters. Each station receives the first special polling character and, if it has data to transmit, sets a switch. The second polling character is received by the first station having set its switch and it intercepts the special character. The remaining stations will not receive the special character and will reset their switches. The station having received both special characters is then enabled to transmit a message and at the end of its message it generates the two special polling characters to enable other stations downstream in the communications system from the first station.

While this system is effective, it may require the use of more intelligent devices at each station and it also removes the flexibility of control of the entire system from the control unit once a polling and message sequence has begun unless additional programming and hardware are supplied at necessarily greater cost and complexity. In addition, the ability to tailor the granting of usage more often to higher traffic density station present difficult implementation problems in the system described in the aforementioned patent.

Therefore, the two above-indicated techniques show a lack of flexibility either at the procedure level, or at the level of sophistication required in the systems to be installed in the switching centers. They are generally appropriate only in communication networks serving long-distance communications (up to several hundreds of kilometers). On the other hand, such systems are inappropriate for internal transmission networks installed, for instance, in a plant or in an administrative building, in which only short-distance communications are performed.

OBJECTS OF THE INVENTION

Consequently, one object of this invention is to provide an improved message switching data transmission system of the decentralized type.

Another object of this invention is to provide an improved data transmission system in which complete messages are transmitted on a very high speed transmission medium thus preventing the data from waiting too long in stations requiring large buffers.

Still another object of this invention is to provide an improved decentralized message switching data transmission system in which the intelligence for operating the system is distributed among all the transmission stations, which makes it particularly fit for use within a given site such as a plant, an administrative building, or a local group of buildings, etc.

BRIEF SUMMARY OF INVENTION

The foregoing and other objects are obtained in a decentralized data transmission system in which all the transmission stations are connected to a very high speed transmission medium. Such a transmission medium may be coaxial cable allowing a transmission speed of 8 megabits/sec to be used. A transmission station having capability as a monitoring station is also connected to the transmission medium. It includes a memory table containing the listing of the transmission station addresses. To begin operation, the monitoring station transmits the address of a first station on the transmission medium. Said address is received by all the stations, but only the station which recognizes its own address is allowed to transmit a message. If this station has a data message to be transmitted to another station, it carries out the transmission of this message which begins with the address of the destination station and ends with an end-of-message (EOM) character. All the stations including the monitoring station, receive the message, but only the destination station intercepts it. The monitoring station recognizes the end-of-message character and then transmits the address of a second station which may respond, and so on. When an addressed station has no message to be transmitted, it sends, however, a particular character provided for recognition by the monitoring station in order to enable the monitoring station to transmit the address of another station.

In a more particular embodiment of this invention, the transmission medium has a loop configuration and a particular synchronization bit pattern is continuously transmitted on the loop for synchronous operation of all of the stations. This pattern is combined with the data bits at the transmission stations and it is subtracted from the combination received at the reception stations. This synchronization bit pattern, when recovered at each station of the loop, permits an efficient bit synchronization of all the stations while it facilitates the transmission of characters in an asynchronous fashion. The combination of the synchronization bit pattern with the data bits and the separation or cancellation thereof at the reception end, can be advantageously ensured, in both cases, by an Exclusive OR circuit. A simple embodiment may be constructed by using the repetitive 0101 series as a particular synchronization bit pattern.

BRIEF DESCRIPTION OF DRAWINGS

The foregoing and other objects, features and advantages of the invention will be apparent from the following more particular description of a preferred embodiment of the invention, as illustrated in the accompanying drawings.

Figure 1:
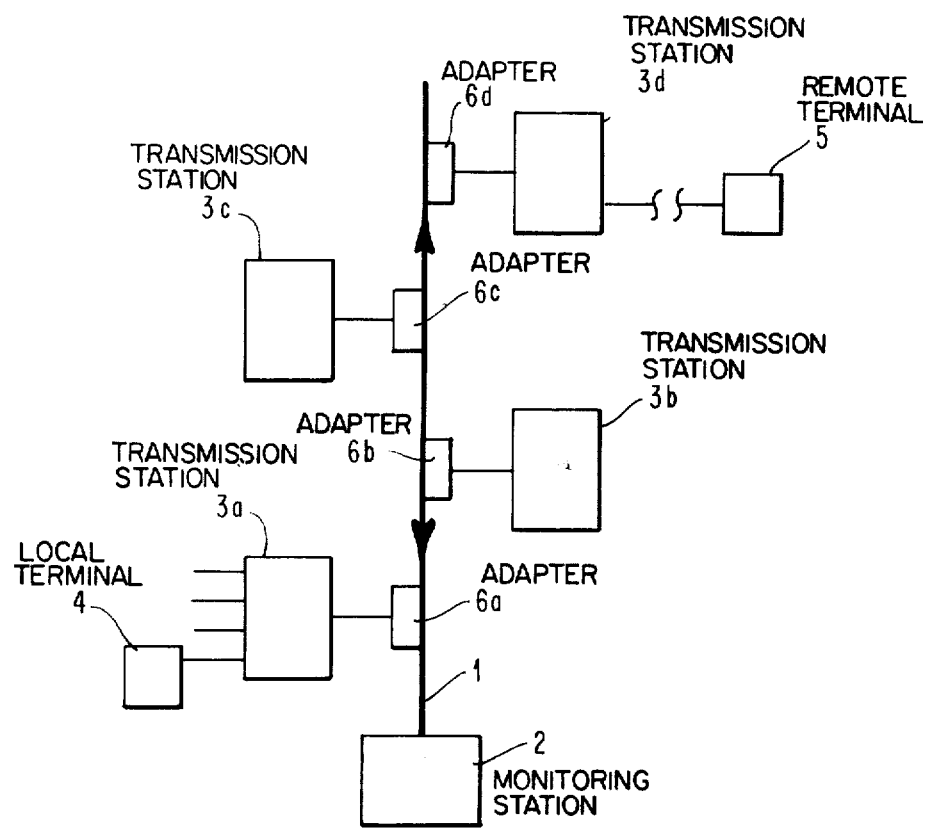
FIG. 1 is a general illustration of the data transmission system of this invention.

According to FIG. 1, a data transmission system of this invention includes a transmission medium 1 to which a monitoring station 2 and transmission stations 3a, 3b, 3c, 3d, . . . are connected. Transmission medium 1 is a very high speed line such as a coaxial cable allowing a transmission speed of 8 megabits/sec approximately, to be used. Each transmission station 3 is linked to a plurality of terminals. These terminals may be local terminals, such as 4, or remote terminals, such as 5. In the latter case, the terminals are linked to the transmission station through modems not shown on the figure since not within the scope of the invention. All these local or remote terminals operate at a low transmission speed as compared to the transmission speed of medium 1. Their transmission speeds can range from 50 bits/sec to 48 kilobits/sec. But terminals operating at different speeds can be easily connected to the same transmission station.

FIG. 1 shows that the transmission stations are connected to transmission medium 1 through adapters 6a, 6b, 6c, 6d, . . . While it is shown as being connected to the transmission station through a line, the adapter is, in fact, integral with the station. In fact, the transmission station is a multiplexer connecting a set of low speed lines to a high speed transmission medium. It is obvious that such a multiplexer can advantageously be a microprocessor. Such a microprocessor should be provided with a set of buffer registers for transferring the data from the terminals to the medium and conversely, and also with a complete adaption logic used as an interface between the station and the transmission medium. Such an adapter will be described in detail below.

Figure 2:
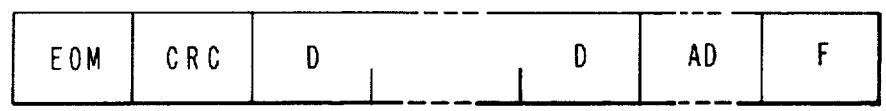
FIG. 2 illustrates the format of the data messages transmitted between the stations.

In general, monitoring station 2 transmits the identification of a transmission station 3 on medium 1. For a better understanding of the invention, let us assume that it is the address of station 3a. Said address is received by all the stations connected to the tranmission medium. It should be noted that at a speed of 8 megabits/second for instance, which is the transmission speed of the data on the transmission medium, a period of time equivalent to several characters, or even to several tens of characters elapses from the moment when the station the closest to the monitoring station receives the identification character, to the moment when the farthest station receives it. In fact, this has no adverse consequence since the station not involved by the identification character, i.e., the stations not recignizing their address, do not react when receiving said character. Only station (3a), the address of which has been transmitted, reacts after the detection of its address. It reacts by transmitting information in two possible ways. In a first hypothesis, station 3a is provided with a message sent by one of its interconnected terminals, terminal 4 for instance, intended for transmission to another terminal. Assuming that this terminal is terminal 5 of station 3d, station 3a transmits, through adapter 6a, a message the format of which can be the one shown in FIG. 2. As shown in this figure, the message is comprised of a heading consisting of a recognition character (F), a station address character (station 3d in this case) and a terminal address character (terminal 5). It is obvious that if the number of the stations connected to transmission medium 1 or the number of the terminals connected to the station exceeds $2^8 = 256$ (a character including 8 bits), two characters or more would have to be provided for identifying the station or the terminal connected to said station. This message includes one or several checking characters (CRC) and ends with an end-of-message character (EOM).

The message transmitted by station 3a on transmission medium 1 is received by all the stations, including monitoring station 2, but only the destination station 3d intercepts it since it is the only one recognizing its address. Then, the message is transferred by the station, for instance 3d, to the destination terminal (terminal 5 in this case) the address of which appears in the message heading. When the monitoring station recognizes an end-of-message character, EOM, it can address another station to make the latter able to transmit, in turn, a message to another station.

In a second hypothesis, station 3a has no data message to be transmitted to another station. In this case, station 3a still transmits a character on the transmission medium so that the monitoring station is able to address another station. Such a character can be an EOM character as in the preceding case or any other special character provided for the purpose of informing the monitoring station that it can address another station.

The monitoring station is provided with a memory having a table containing the addresses of the stations in the order in which they are to be addressed. The order of the addresses in the table can be the geographical order of the stations on the transmission medium, but it is obvious that this is not compulsory. In the same way, it is possible and sometimes even helpful, to place the address of a station several times in the table to make this station able to transmit more often. This is often the case when a station is connected to terminals having a very large volume of data to be transmitted. In order to maximize the operation of the system, it is helpful to update the order or number of occurrences of the addresses in the table at regular intervals. This may be done to take the traffic variations in the terminals into account. For this, it is possible to provide a data input unit or, if the monitoring station is a sufficiently "intelligent" unit such as a computer, the updating can automatically be performed by an optimizing program stored in the memory. As examples of such techniques, see the IBM Technical Disclosure Bulletin, Vol. 19, No. 10, March 1977, pages 3821-3823 or Vol. 19, No. 11, April 1977, pages 4313 through 4318.

The preferred embodiment of this invention will be described herebelow while referring to FIG. 3. In effect, it is helpful that the high speed transmission medium which can be a coaxial cable, be arranged in a loop. In a loop configuration, the signals move always in the same direction. This avoids changes of the transmission direction in the transmission medium, which cannot be avoided in the arrangement of FIG. 1. This avoids the fairly important turn-over times present in the arrangement of FIG. 1 during which it is impossible to transmit and which reduces the output and the efficiency of the system.

Figure 3:
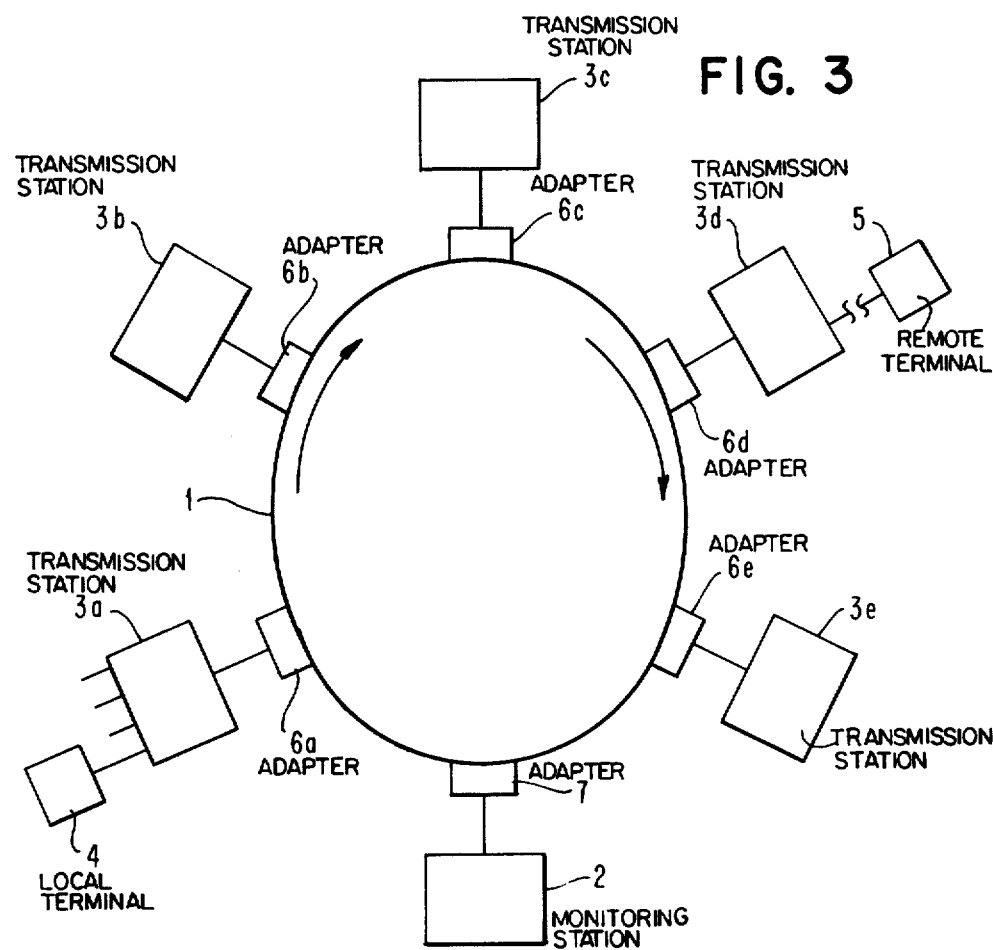
FIG. 3 illustrates a preferred embodiment of this invention in which the transmission medium is shaped as a loop.

The system as shown in FIG. 3, includes as previously, a set of transmission stations 3 linked to transmission medium 1 by adapters 6. But monitoring station 2 should also be connected to the loop through an adapter 7 since the information signals move through this station as through the other stations.

As previously described, monitoring station 2 transmits the address of a station (station 3a for instance) on the medium shaped as a loop. This address is received by all the stations, but only destination station 3a recognizes its address. It should be noted that the monitoring station intercepts the signals it has transmitted as do the other stations. This makes possible a constant monitoring of the operation of the transmission medium.

Then, station 3a, which has a message from terminal 4 to be transmitted to station 3d for terminal 5, sends its message over the loop. This message goes through adapters 6b of station 3b, 6c of station 3c and 6d of destination station 3d. On the other hand, when station 3d transmits a message to station 3a, the message goes through adapters 6e of station 3e, 7 of monitoring station 2 and 6a of station 3a.

In a system in accordance with this invention, it is necessary, due to the high transmission speed on the medium, even if said medium does not show an excessive length, to maintain bit synchronization while respecting the asychronization at the character level. This synchronization can be ensured by the generation of a particular pattern at a control point in the system, for example, by the monitoring station. This bit pattern continuously transmitted on the transmission medium, is superposed on the data signals issued from the transmission stations or on the addressing signals issued from the monitoring station. At the receiving end, the reverse operation is performed, i.e., the signals representing the particular bit pattern are subtracted to retrieve the significant data. The particular pattern moving continuously on the transmission medium provides the bit synchronization at each station adapter and also allows the device to operate independently from the character synchronization as shown in the following description.

As will not be described, the preferred embodiment of this invention uses the uninterrupted 0101 ... series of bits to provide bit synchronization. But it is obvious that this pattern could be any other repetitive synchronization bit pattern since, after being superimposed on the data signals at the transmission end, any such pattern is subtracted from said data signals at the reception end.

Figure 4:
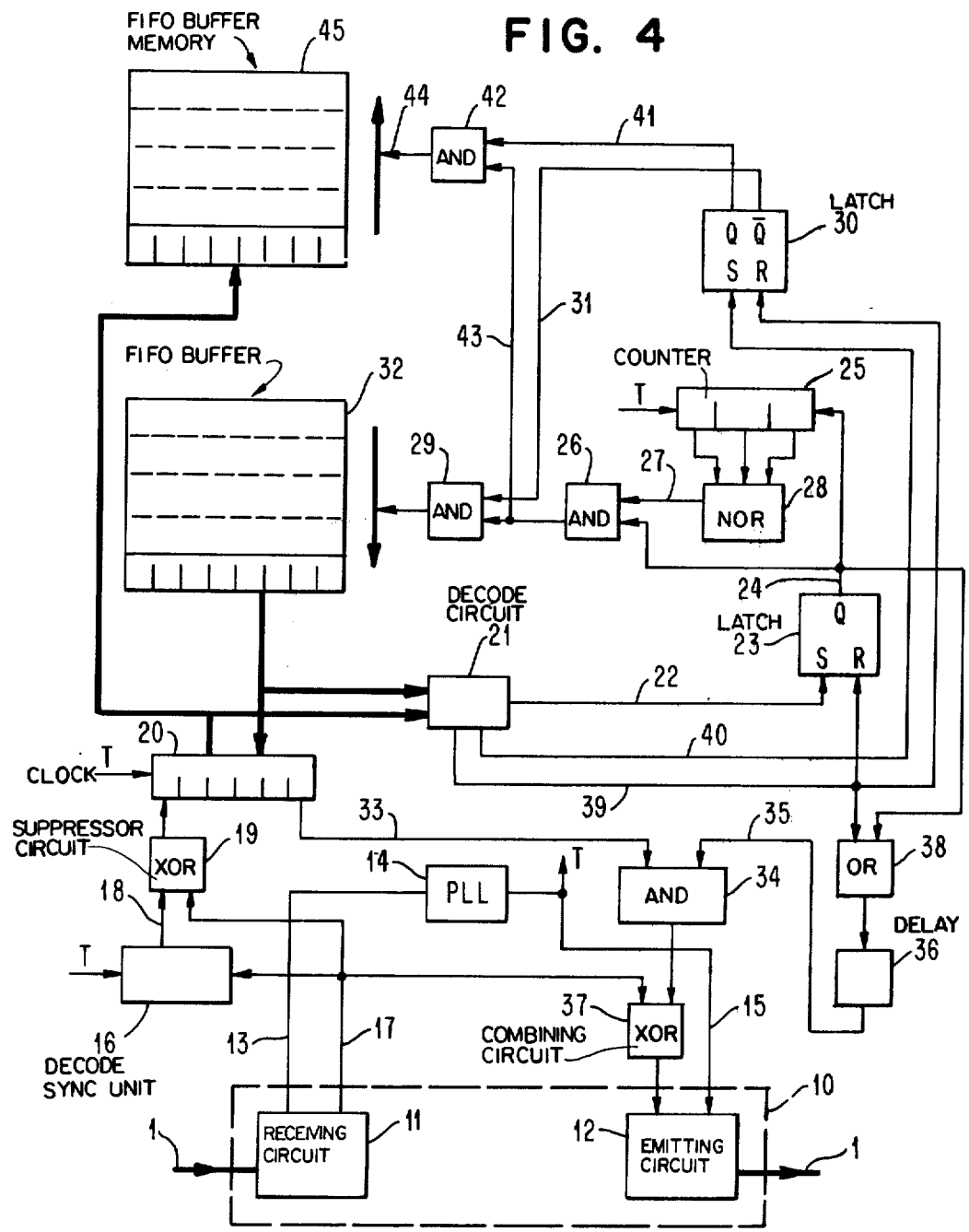
FIG. 4 is a block diagram of an embodiment of the transmission station adapter of the invention as embodied according to FIG. 3.

Now, let us refer to FIG. 4 which illustrates an embodiment of the station adapter when the transmission system is in a loop configuration as shown in FIG. 3.

As shown in FIG. 4, the adapter is connected to transmission medium 1 through a repeater 10 comprising receiving circuit 11 and emitting circuit 12. The purpose of the repeater, in addition to providing maintainence of the bit synchronization, is to re-shape the signals received by receiving circuit 11. Such a repeater, which is not within the scope of the invention, can be the repeater included in the 8 megabit modem of IBM unit 5975 L01.

The internal clock is generated by phase locked loop (PLL) circuit 14 from the information signals carried by line 13 and issued from receiving circuit 11. Loop PLL, well known in the art and not described in this specification, provides clock pulses T to the various circuits of the adapter and to emitting circuit 12 through line 15. The purpose of the decode and synchronization unit 16 is for regenerating the repetitive synchronization bit pattern from the information signals received from the loop through receiving circuit 11 and line 17 on the one hand, and from clock pulses T on the other hand. Output 18 of decode and synchronization unit 16 is transmitted to suppressor circuit 19 where the synchronization bit pattern is subtracted from the information signals received on line 17. Then, the resulting signals are transmitted to shift register 20 in which they are shifted on every clock pulse T.

It should be noted that the signals received in the shift register can be of two types. When significant data are received by receiving circuit 11, whether they are addressing data issued from the monitoring station or data characters of a message issued from a station, these significant data are effectively loaded into register 20. On the other hand, when only the synchronization bit pattern is received by receiving circuit 11, the bits loaded into register 20 are 0 bits since the synchronization bit pattern has been subtracted from the signals received by suppressor circuit 19. Therefore, it is required that no data or address character be provided with only zeros. For instance, in the case of 8 bit characters (shift register 20 has eight positions), data or address character could be provided with less than seven zeros.

From the significant data received into register 20, two cases are possible. When the monitoring station has transmitted the address of the station to make it able to transmit, this address loaded in register 20 is decoded by decode circuit 21 when all the bits of the address are in the register. The detection of any station address by circuit 21 causes a bit 1 to be applied to the set input of a latch 23 through line 22. Latch 23 being set enables through its output 24, a 3-stage counter 25 originally set to 0. This allows output 27 or NOR circuit 28 to be set to 1. The high output of latch 23 also enables AND circuit 26. This allows bit 1 on line 27 to enable AND circuit 29.

As shown in the following, when latch 30 is set, it implies that a bit 1 is also present at the second input 31 of AND circuit 29. Therefore a high signal is transmitted to the output of AND circuit 29 towards the controls of buffer 32. This buffer is a wired queue memory operating in the FIFO mode. Then, the high output on the output of AND circuit 29 controls the transfer in parallel of the first character of the message to be transmitted into shift register 20. Then the character is transmitted, bit by bit, on line 33 towards AND circuit 34. AND circuit 34 is enabled through line 35 following the setting of latch 23, through OR circuit 38 and delay circuit 36. Delay circuit 36, which will be described later, is necessary since the decoding of the address in register 29 is carried out will before the end of the period of time corresponding to the transfer of the last bit into the register. In such a condition, if the transfer of the first character of the message from memory 32 to register 20, was carried out on the next clock pulse, it would be possible without this circuit to transmit the rightmost bit of the address character, which would produce an erroneous data.

Therefore, the bits are transmitted through AND circuit 34 toward combining circuit 37. Since the station is the only one at this time which can transmit data on the loop, the information signals received by circuit 11 and transmitted to circuit 37 through line 17 are, therefore, the synchronization bit patterns. Said synchronization bits are combined in circuit 37 with the data signals and then the combined signals are transmitted on loop 1 through emitting circuit 12 of repeater 10. It should be noted that suppressor and combining circuits 19 and 37 can advantageoulsy be of the Exclusive Or type.

As long as the characters of the message appear to be transmitted towards another station, counter 25 incrementing on every clock pulse, comes back to 0 on every 8 clock pulses, i.e., at the end of the period of time required by a character to be transmitted bit by bit from register 20. Each time counter 25 reads 9, the output of NOR circuit 28 provides a 1 which, through AND circuits 26 and 29, causes a character of memory 32 to be transferred into register 20. When the EOM character is transferred, it is decoded by decode circuit 21 which sends a signal resetting latch 23 through line 39. When latch 23 is reset, its output 24 goes down to 0, which inhibits AND circuits 26 and 29 and locks counter 25 to 0. This signal should normally close data transmission AND circuit 34 after a given delay. But in fact, when the EOM character is decoded by decode circuit 21, a signal is also transmitted through line 29 and OR circuit 38 to delay circuit 36 which enables AND circuit 34 for the 8 bit times required by the bits of the EOM character to be transmitted on the loop.

The second case to be explained is the case where the station receives a message intended for it. In this case, a recognition character (F) is received by register 20. Then, decode circuit 21 which decodes the character, sends a signal on its output 40 which sets latch 30. Then, latch 30 enables, through its output Q 41, AND circuit 42. If the message is addressed to the station, recognition character F is followed by the address character of the station. This address character is decoded by decode circuit 21 which, as previously in the transmission case, transmits a 1 bit on line 22 which sets latch 23. Again, counter 25 increments, AND circuit 26 opens each time the counter reads 0, but AND circuit 29 remains inhibited since it receives an input 0 through line 31 from output Q of latch 30 which has just been set. On the other hand, each time counter 25 reads 0, AND circuit 26 provides a signal on line 43 and a 1 is transmitted on line 44 through AND circuit 42 which is already enabled by its input 41. The purpose of line 44 is the control of the gates provided for the parallel transfer of the characters from register 20 to memory 45 and from register to register in said memory. Buffer 45 is also a wired queue memory of the FIFO type well known in the art and not described in this specification.

The transfer of the characters from register 20 towards memory 45 carries on until the reception of the EOM character. In this case, the EOM character is decoded by decode circuit 21 and a bit 1 is transmitted by circuit 21 on line 39 to reset latches 23 and 30. The resetting of latch 23 inhibits AND circuits 29 and 42 and locks counter 25 to 0.

In FIG. 4, a memory is used for receiving data and another memory is used for emitting data in each transmission station. In fact, the same memory could be used for both ways of transmission. This can be easily done when the transmission is controlled by a microprocessor.

The adapter of the monitoring station will be described while referring to FIG. 5. A portion of the circuits being identical with the circuits of a transmission station adapter, the reference numbers of these circuits are maintained. The information signals transmitted on loop 1 are received by receiving circuit 11 of repeater 10 identical with the ones of the other transmission stations. As explained above, the signals are provided to PLL circuit 14 which delivers clock pulses T at its output 15, said clock pulses T being used for synchronizing the adapter circuits. The signals are also provided to decode and synchronization unit 16 through line 17 in order to retrieve the synchronization bit pattern, i.e., 0101 . . . in this particular embodiment. Then, the information signals are combined in suppressor circuit 19 which can be an Exclusive OR circuit, with the synchronization bit pattern so as to remove this pattern from the information signals. Then, the significant data signals are provided to the input of shift register 20 where they are decoded on every bit time by decode circuit 50. When decode circuit 50 decodes the EOM character of a message transmitted between two stations, a control signal is transmitted on line 51. This signal is for controlling the transfer of the address of the next station to be enabled to transmit from a table of addresses contained in a memory 52 to shift register 20. In the same time, the signal carried by line 53 enables delay circuit 36, the output 54 of which enables data transmission AND circuit 55, after a given delay as explained above, to avoid an erroneous transmission from register 20.

Another purpose of circuit 36 is to enable AND circuit 55 for the 8 bit times required for transmitting 8 bits of the character contained in register 20. AND circuit 55 being enabled, the bits of the address character which have been just transferred in parallel into register 20, are transmitted through output line 56 of the register. These bits are transmitted also through AND circuit 55 and line 57 to the input of combining circuit 58 (an Exclusive OR circuit in the preferred embodiment of the invention) where they are combined with the bits of synchronization bit pattern 0101 transmitted on line 59 as shown in the following.

From circuit 58, the address bits combined with the synchronization bit pattern, are transmitted through line 60 to emitting circuit 12. Emitting circuit 12 transmits said bits after reshaping, on line 1.

It was shown above that the data signals, after subtraction of the synchronization bit pattern, are provided by suppressor circuit 19. These signals carried by line 61 are either significant data transmitted from one station to another, or are a series of zeros in the opposite case. These data signals are combined in combining circuit 62 identical with circuit 58, with the bits of the synchronization bit pattern provided by generator 63. In a particular embodiment of the invention, the generator is a latch with only one input which changes of state on every clock pulse and thus, provide the series 0101 ...

Therefore, it is shown that when a transmission station transmits a message to another station, the data bits provided by line 61 are combined with the synchronization bit pattern through circuit 62, and are then transmitted through line 59 to second combining circuit 58. But in this case, line 57 is set to zero since the monitoring station does not transmit and AND circuit 55 is closed.

In the second case, i.e., when the signals carried by line 61 are zeros, combining circuit 62 provides the synchronization bit pattern on line 59. If at this time, AND circuit 55 is enabled so as to transmit the bits of the address character on line 57, said bits are combined by combining circuit 58 with the synchronization bit pattern of line 59, said combination being transmitted on loop 1 by emitting circuit 12. If not, only the synchronization bit pattern is transmitted on loop 1.

Figure 5:
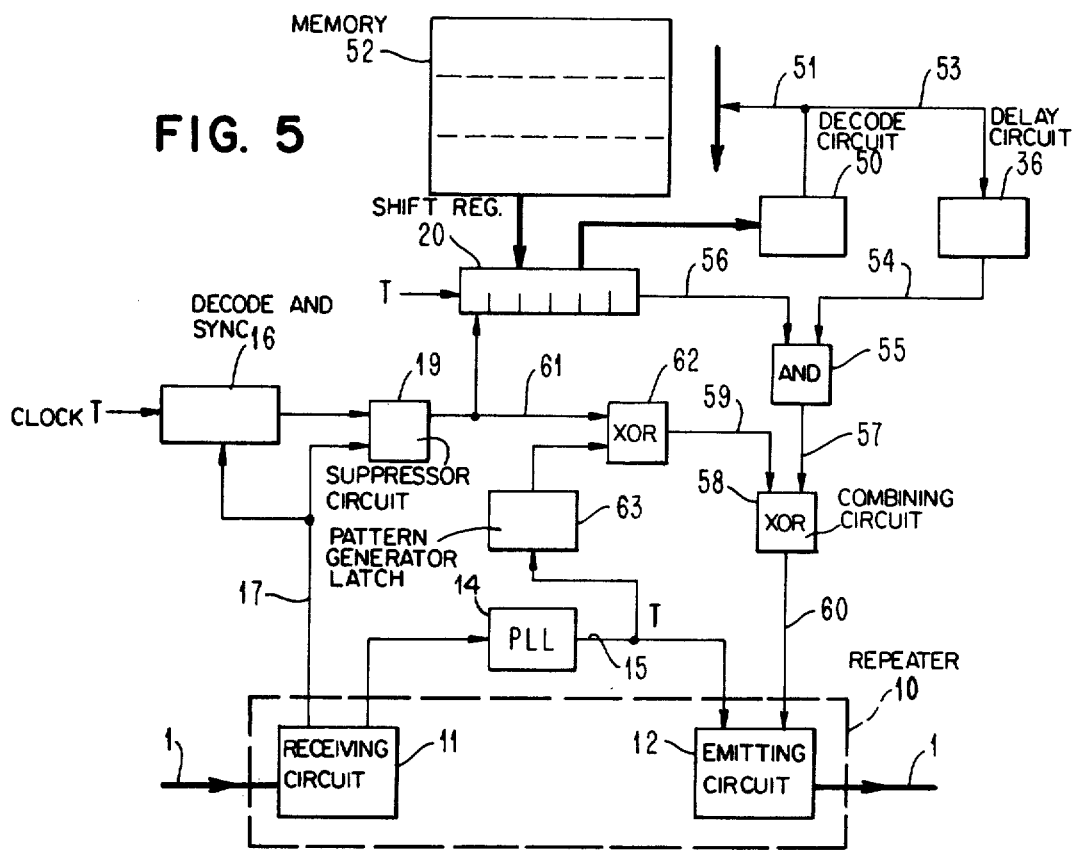
FIG. 5 is a block diagram of an embodiment of the monitoring station adapter of the invention as embodied according to FIG. 3.
Figure 6:
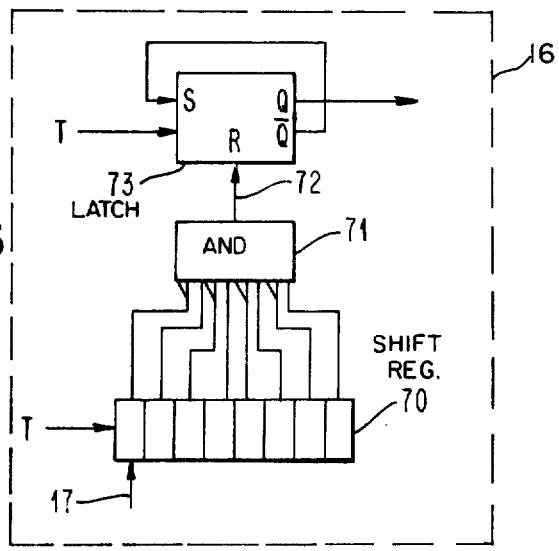
FIG. 6 illustrates an embodiment of the synchronization and decode unit used in the adapters of FIGS. 4 and 5.

FIG. 6 shows decode and synchronization unit 16 of FIGS. 4 and 5. As shown in this figure, unit 16 includes a shift register 70 serially receiving the data transmitted on line 17 through receiving circuit 11 of repeater 10. When pattern 01010101 is loaded into the register as shown on the figure, AND circuit 71 provides a 1 at its output 72 since this circuit includes true inputs from the even cells of the register containing bits 1, and complementary inputs from the odd cells containing bits 0. Then latch 23 is reset by the signal on line 72 and its output Q is set to 0. Since output Q of latch 73 is set to 0, output $\overline{Q}$ connected to the set input causes the latch to be set on the next clock pulse and at this time, a 1 is provided on output Q. Therefore, it is shown that when the synchronization bit pattern is transmitted alone on the loop, when a bit 0 is received on line 17, a 0 bit is also provided from the output latch 73 and it is the same for a 1 bit. Now, when line 17 provides bits other than the synchronization bit pattern, i.e., bits resulting from the combination of said pattern with data or address bits, AND circuit 71 is inhibited and its output is set to 0. But it does not matter since latch 73 changes state on every clock pulse and has been synchronized when only the synchronization bit pattern is received. Consequently, one of the inputs of suppressor circuit 19 (see FIG. 5) provides the synchronization bit pattern synchronized with the bits received by the second input of circuit 19 which result from the combination of this pattern with the data bits.

While it is sufficient to initiate the repetitive setting of latch 73, the latter is resynchronized every time register 70 receives only the synchronization bit pattern and then provides a signal to the reset input of the latch through line 72.

It should be noted that any synchronization bit pattern can be used provided that a decode and synchronization unit adapted to reproduce said pattern in synchronization with the signals resulting from its combination with the data bits is provided also.

Figure 7:
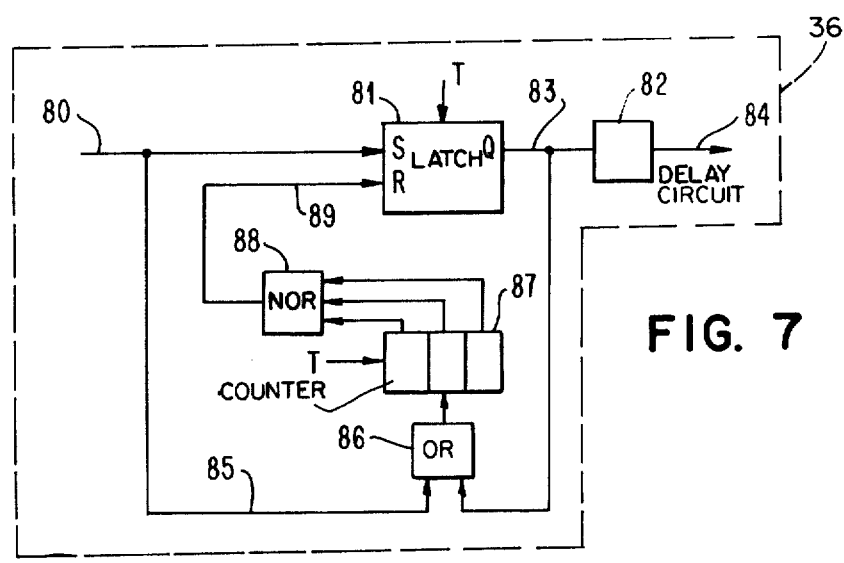
FIG. 7 illustrates an embodiment of the delay circuit used in the adapters of FIGS. 4 and 5.

FIG. 7 shows the delay circuit 36 used in FIGS. 4 and 5. This circuit includes an input 80 which provides a signal when the EOM character is detected by the decoding circuit, as shown above. This input is connected to the set input of a latch 81 which changes state only on the clock pulses. Consequently, although decode signal 80 is provided well before the end of the last bit time of the decoded character, output Q of the latch provides a 1 only at the clock pulse. To be sure that no erroneous data is transmitted from register 20 (refer to FIGS. 4 and 5), there is provided a delay circuit 82 connected to output 83 of the latch so that the output signal on line 84 is slightly delayed after the clock pulse provided simultaneously with the transfer of the data into register 20.

The signal on line 80 is also transmitted to input 85 of an OR circuit 86 which unlocks a 3-bit counter 87. This counter which was originally set to 0, begins to increment from the bit time preceding the transfer of the character into register 20. Consequently, the latch which was reset by input 89 from NOR circuit 88 and is supplying a 1 since the three stages of the counter read 0, is set by the next clock pulse. This is so since the pulse is still present on line 80 (as long as the transfer of the character is not carried out into register 20) and the counter is already set to 001 and no signal is present on the reset input. Then, although the signal on line 80 disappears, the counter continues to increment by means of second input 83 of OR circuit 86 from output Q of the latch. The counter increments in this way for 8 bit times and when it comes back to 0, a signal is provided by NOR circuit 88 to reset input 89 of the latch. But this signal resets the latch only on the next clock pulse. The resetting of the latch causes line 84 to go back to low level (after a slight delay) and locks counter 87. Thus, the delaying circuit of FIG. 7 allows the EOM character to be transferred bit by bit on the loop.

A portion of the functions ensured by the circuits described above while referring to FIGS. 4, 5, 6 and 7 could be performed by a microprocessor as said before. The present state of the art allows a microprocessor to be included in each station for ensuring the transfer of the data between the adapter and the loop at reasonable cost.

If a relatively intelligent unit such as a computer or a microprocessor is used in the monitoring station, it is possible to carry out an automatic programmed updating of the table taking the extent of the traffic of the stations one with respect to the others into account at regular intervals.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters patent is:

1. In a data transmission system including a transmission medium to which are connected a plurality of transmitting stations and a monitoring station, a method of operating said system so that any information signals transmitted by a station will be received by all the transmitting stations and the monitoring station, said method comprising steps of:
- transmitting from said monitoring station the address of a first transmitting station on said transmission medium;
- receiving and recognizing said address at said first transmitting station and, responsive to said reception and recognition of said address, transmitting from said first transmitting station either a message or a status idle character when there is no data message for transmission, said transmitting of a data message being destined for one of said other transmitting stations and said data message beginning with the address of said destination transmitting station and ending with an end of message character; and
- receiving and recognizing either said status idle character or said end of message character at said monitoring station and, responsive to the reception and recognition of either of said characters, transmitting the address of a second transmitting station on said transmission medium.

2. A method of operating a data transmission system as described in claim 1, further comprising the steps of:
- arranging said transmission medium in a loop configuration; and
- transmitting said information signals only in one direction on said transmission medium.

3. The method as described in claim 2, wherein:
- said transmitting of said data on said transmission medium occurs at a relatively high transmission speed and the transmitting stations connected to said transmission medium receive and transmit data from terminals connected thereto at relatively low speeds.

4. A method as described in claim 2 or in claim 3, and further including:
- continually generating and transmitting from said monitoring station over said loop transmission medium a series of synchronization bit patterns; and
- superimposing said addressing data on said synchronization bit patterns during the transmission of said addresses of said transmitting stations by said monitoring station.

5. A method of operating a data transmission system as described in claim 4 and including the steps of:
- receiving at each said transmitting station said superimposed data and synchronizing bits and removing said synchronization bit patterns from the received information signals, thereby detecting the presence of either significant data or of zero bits in the case there is no significant data; and
- retransmitting either the information signals received or retransmitting data bits superimposed on said synchronization bit patterns from said transmitting station.

6. The method as described in claim 5, wherein the operation of each of said transmitting stations includes the step of:
- loading said bits resulting from said subtracting of said synchronization bit patterns from said received bits into a shift register in parallel and serially retransmitting the contents of said shift register as a serial stream of bits from said transmitting station.

7. A method of operating a data transmitting system as described in claim 5:
- said transmitting step at each said transmitting station includes an exclusive OR'ing during said superimposition process wherein said data bits and said synchronization bit pattern are superimposed; and
- said receiving and subtracting step includes an exclusive OR'ing process for subtracting said synchronization bit pattern from said received information signals.

8. The method as described in claim 5, wherein said synchronizing bit patterns are generated in a generating step which includes the step of repetitively generating the series of bits 010101.

9. The method as described in claim 4 wherein said synchronizing bit patterns are generated in a generating step which includes the step of repetitively generating the series of bits 010101.

10. The method as described in claim 7 wherein said synchronizing bit patterns are generated in a generating step which includes the step of repetitively generating the series of bits 010101.

11. A method of operating a data transmitting system as described in claim 6 wherein:
- said transmitting step at each said transmitting station includes an exclusive OR'ing during said superimposition process wherein said data bits and said synchronization bit pattern are superimposed; and
- said receiving and subtracting step includes an exclusive OR'ing process for subtracting said synchronization bit pattern from said received information signals.

12. The method as described in claim 6, wherein said synchronizing bit patterns are generated in a generating step which includes the step of repetitively generating the series of bits 010101.

13. The method as described in claim 10, wherein said synchronizing bit patterns are generated in a generating step which includes the step of repetitively generating the series of bits 010101.

* * * * *